(12) United States Patent
Shenhar et al.

(10) Patent No.: US 8,778,478 B2
(45) Date of Patent: Jul. 15, 2014

(54) ASSEMBLIES COMPRISING BLOCK CO-POLYMER FILMS AND NANORODS

(75) Inventors: Roy Shenhar, Mevassert Zion (IL); Uri Banin, Mevasseret Zion (IL); Elina Ploshnik, Jerusalem (IL); Asaf Salant, Jerusalem (IL)

(73) Assignee: Yissum Research Development Company of the Hebrew University of Jerusalem, Ltd., Jerusalem (IL)

( * ) Notice: Subject to any disclaimer, the term of this patent is extended or adjusted under 35 U.S.C. 154(b) by 513 days.

(21) Appl. No.: 13/147,753

(22) PCT Filed: Feb. 4, 2010

(86) PCT No.: PCT/IL2010/000101
§ 371 (c)(1),
(2), (4) Date: Aug. 3, 2011

(87) PCT Pub. No.: WO2010/089743
PCT Pub. Date: Aug. 12, 2010

(65) Prior Publication Data
US 2011/0293879 A1    Dec. 1, 2011

Related U.S. Application Data

(60) Provisional application No. 61/149,737, filed on Feb. 4, 2009, provisional application No. 61/226,144, filed on Jul. 16, 2009.

(51) Int. Cl.
*B32B 27/32* (2006.01)
*B32B 9/00* (2006.01)
*B32B 5/12* (2006.01)
*B29B 9/06* (2006.01)
*D01F 9/12* (2006.01)
*C08J 5/18* (2006.01)

(52) U.S. Cl.
CPC ............... *C08J 5/18* (2013.01); *C08J 2353/00* (2013.01); *C08J 2300/00* (2013.01)
USPC ............ 428/105; 428/220; 428/367; 264/5; 423/447.1; 423/447.2; 423/447.3; 423/445 B

(58) Field of Classification Search
None
See application file for complete search history.

(56) References Cited

PUBLICATIONS

Murray, et al., "Synthesis and Characterization of Monodisperse Nanocrystals and Close-Packed Nanocrystal Assemblies", Annu. Rev. Mater. Sci., vol. 30, pp. 545-610, (2000).
Cui, et al., "Integration of Colloidal Nanocrystals into Lithographically Patterned Devices", Nano Letters, vol. 4, No. 6, pp. 1093-1098, (2004).
Bockstaller, et al., "Size-Selective Organization of Enthalpic Compatibilized Nanocrystals in Ternary Block Copolymer/Particle Mixtures", J. Am. Chem. Soc., vol. 125, pp. 5276-5277, (2003).
Chiu, et al., "Control of Nanoparticle Location in Block Copolymers", J. Am. Chem. Soc., vol. 127, pp. 5036-5037, (2005).

(Continued)

*Primary Examiner* — David Sample
*Assistant Examiner* — Nicole T Gugliotta
(74) *Attorney, Agent, or Firm* — Vorys, Sater, Seymour and Pease LLP; Susanne M. Hopkins

(57) ABSTRACT

Provided is an assembly including a block co-polymer film and a plurality of nano-rods; where the plurality of nano-rods are oriented at the surface of the block co-polymer film, substantially perpendicular to at least one interface between block co-polymer domains. Further provided are methods of assembly formation and devices including such assemblies.

16 Claims, 12 Drawing Sheets

Perpendicular

Parallel

(56) References Cited

PUBLICATIONS

Zhang, et al., Controlled Placement of CdSe Nanoparticles in Diblock Copolymer Templates by Electrophoretic Deposition, Nano Letters, vol. 5, No. 2, pp. 357-361, (2005).

Thompson, et al., "Predicting the Mesophases of Copolymer-Nanoparticle Composites", Science, vol. 292, pp. 2469-2472, (2001).

Kim, et al., "Langmuir-Blodgett Nanorod Assembly", J. Am. Chem. Soc., vol. 123, pp. 4360-4361, (2001).

Li, et al., "Semiconductor Nanorod Liquid Crystals and Their Assembly on a Substrate", Adv. Mater., vol. 15, No. 5, pp. 408-411, (2003).

Li, et al., "Semiconductor Nanorod Liquid Crystals", Nano Letters, vol. 2, No. 6, pp. 557-560, (2002).

Meuer, et al., "Liquid Crystalline Phases from Polymer-Functionalized TiO2 Nanorods", Adv. Mater., vol. 19, pp. 2073-2078, (2007).

Sundaram, et al., "Electrochemical Modification of Graphene", Adv. Mater., vol. 20, pp. 3050-3053, (2008).

Zhang, et al., "Surface-Functionalized CdSe Nanorods for Assembly in Diblock Copolymer Templates", J. Am. Chem. Soc., vol. 128, pp. 3898-3899, (2006).

Son, et al., "Placement Control of Nanomaterial Arrays on the Surface-Reconstructed Block Copolymer Thin Films", ACS Nano, vol. 3, No. 12, pp. 3927-3934, (2009).

Deshmukh, et al., "Two-Dimensional Confinement of Nanorods in Block Copolymer Domains", Nano Letters, vol. 7, No. 12, pp. 3662-3668, (2007).

Shou, et al., "Predicting the self-assembled morphology and mechanical properties of mixtures of diblocks and rod-like nanoparticles", Composite Interfaces, vol. 10, No. 4-5, pp. 343-368, (2003).

Tang, et al., "Self-Assembly of Rod-Shaped Particles in Diblock-Copolymer Templates", J. Phys. Chem. B, vol. 113, pp. 10117-10120, (2009).

Ryan, et al., "Electric-Field-Assisted Assembly of Perpendicularly Oriented Nanorod Superlattices", Nano Letters, vol. 6, No. 7, pp. 1479-1482, (2006).

Gupta, et al., "'Self-Corralling' Nanorods under an Applied Electric Field", Nano Letters, vol. 6, No. 9, pp. 2066-2069, (2006).

van der Zande, et al., "Optical Properties of Aligned Rod-Shaped Gold Particles Dispersed in Poly(vinyl alcohol) Films", J. Phys. Chem. B, vol. 103, pp. 5761-5767, (1999).

Ueno, "Optical properties of nanoengineered gold blocks", Optics Letters, vol. 30, No. 16, pp. 2158-2160, (2005).

Liu, et al., "Assembly and Alignment of Metallic Nanorods on Surfaces with Patterned Wettability", Small, vol. 2, No. 12, pp. 1448-1453, (2006).

Pelton, et al., "Optical trapping and alignment of single gold nanorods by using plasmon resonances", Optics Letters, vol. 31, No. 13, pp. 2075-2077, (2006).

Tao, et al., "Langmuir-Blodgett Silver Nanowire Monolayers for Molecular Sensing Using Surface-Enhanced Raman Spectroscopy", Nano Letters, vol. 3, No. 9, pp. 1229-1233, (2003).

Mokari, et al., "Synthesis and Properties of CdSe/ZnS Core/Shell Nanorods", Chem. Mater., vol. 15, pp. 3955-3960, (2003).

Garamszegi, et al., "Synthesis of thiol end-functional polystyrene via atom transfer radical polymerization", Reactive & Functional Polymers, vol. 55, pp. 179-183, (2003).

33nm, f=0.36, s=0.59±0.02

21nm, f=0.20, s=0.51±0.23

11nm, f=0.20, s=0.41±0.05

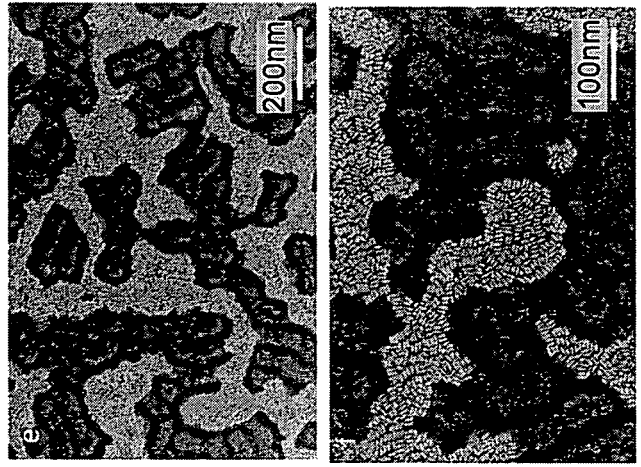
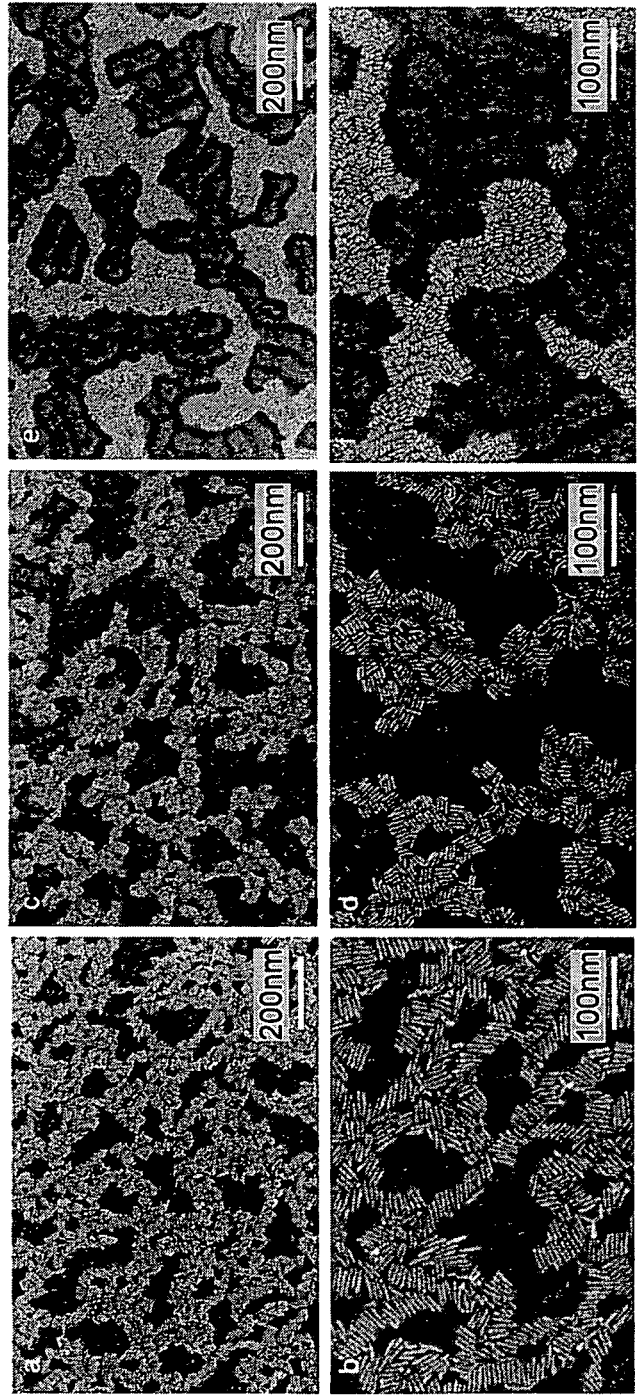
Fig.4A  33nm, f=0.31, s=0.59±0.06
Fig.4B
Fig.4C  21nm, f=0.11, s=0.46±0.04
Fig.4D
Fig.4E  11nm, f=0.10, s=0.40±0.09
Fig.4F 33nm, f=0.05, s=0.13±0.06

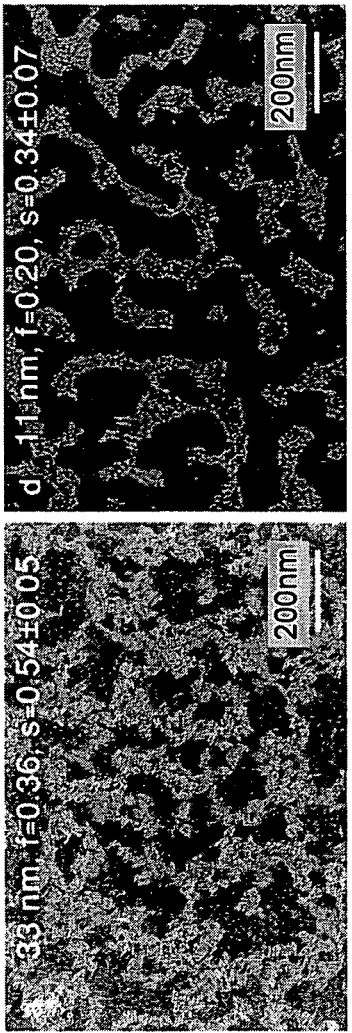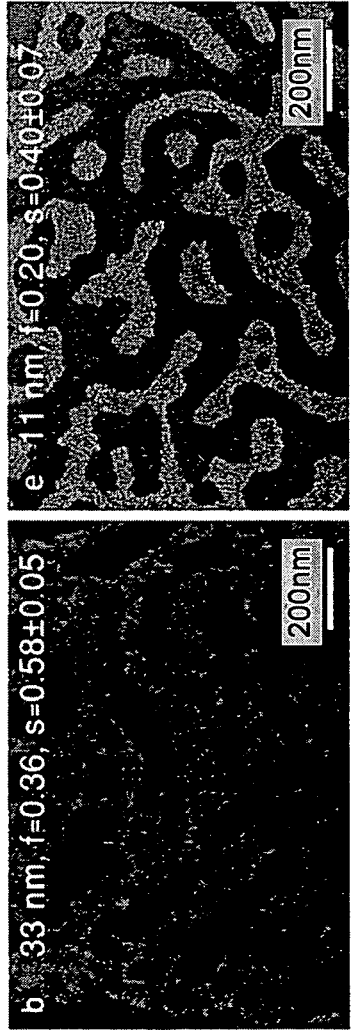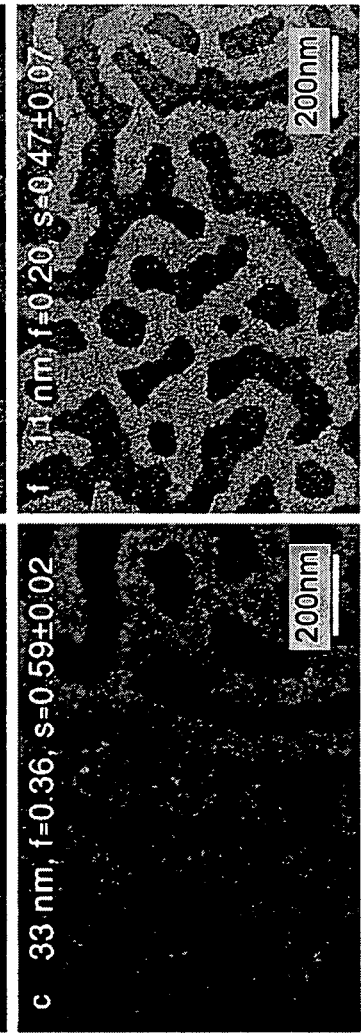

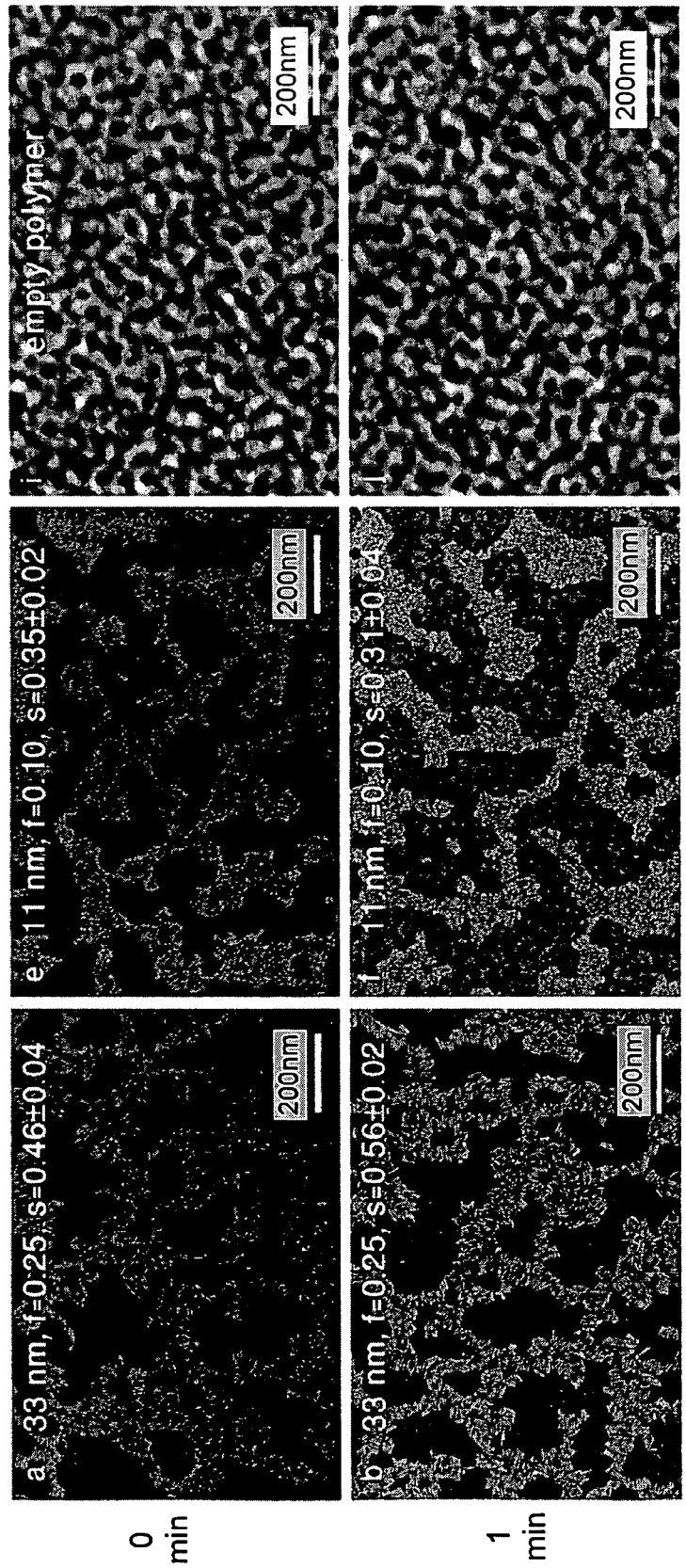

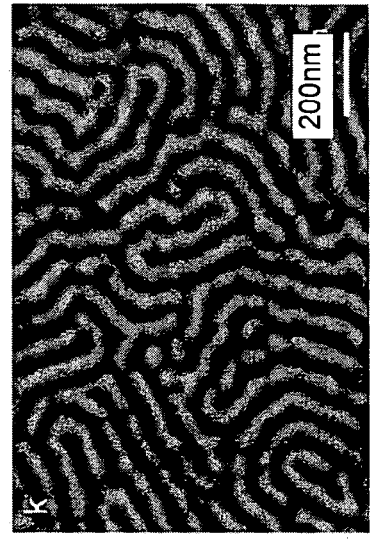
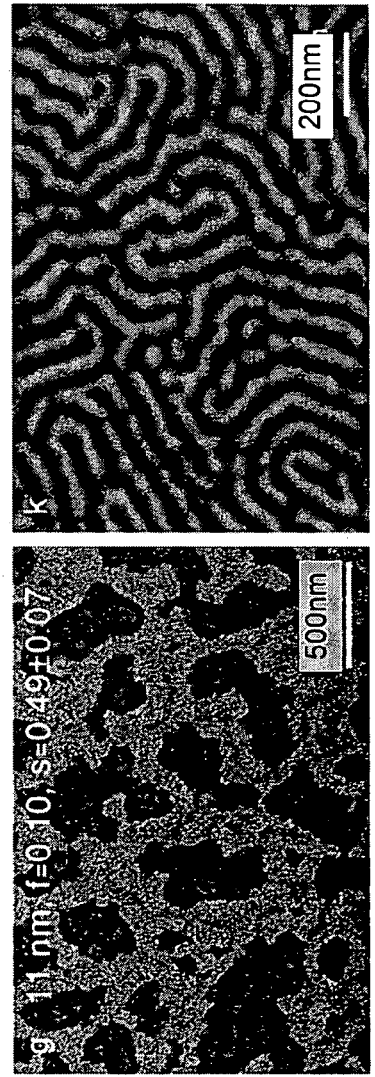
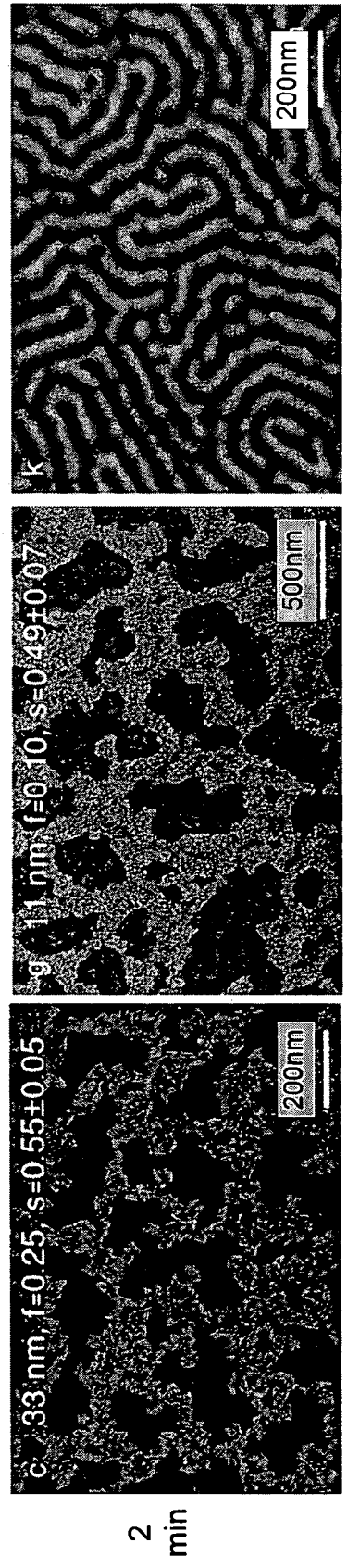
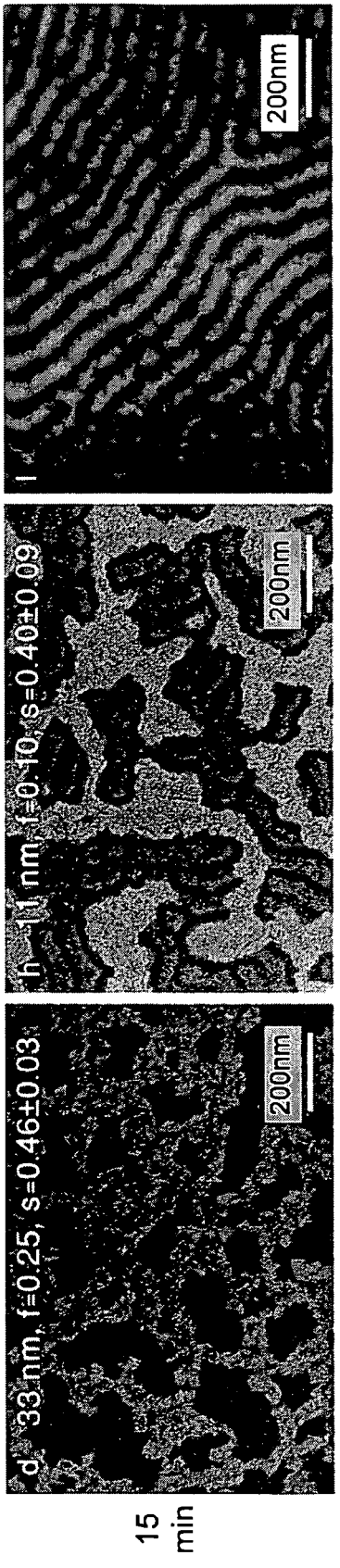

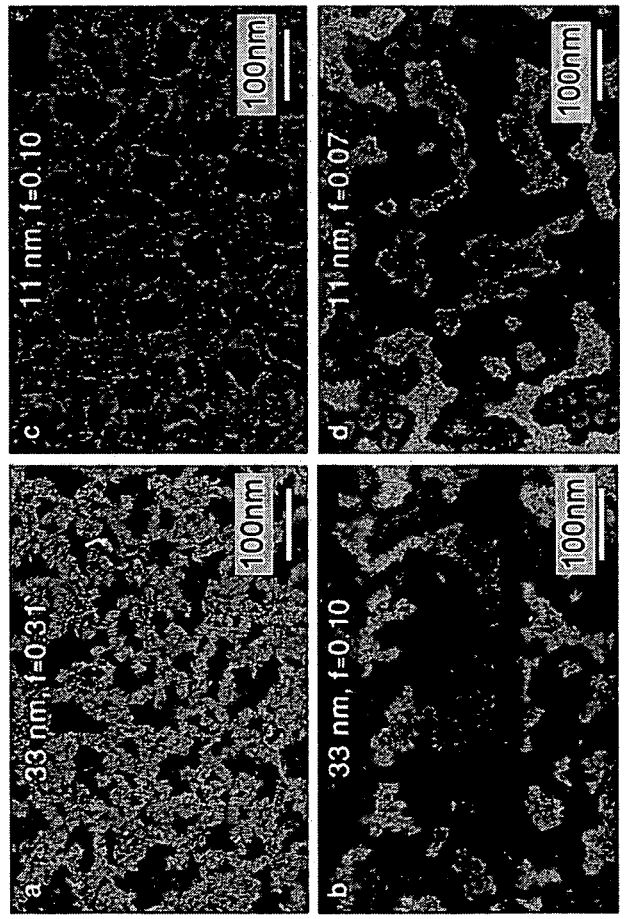

ND NANORODS

This is a National Phase Application filed under 35 U.S.C. §371 as a national stage of PCT/IL2010/000101, filed on Feb. 4, 2010, an application claiming the benefit under 35 U.S.C. §119(e) of U.S. Provisional Application No. 61/149,737, filed on Feb. 4, 2009, and an application claiming the benefit under 35 U.S.C. §119(e) of U.S. Provisional Application No. 61/226,144, filed on Jul. 16, 2009, the content of each of which is hereby incorporated by reference in its entirety.

FIELD OF THE INVENTION

This invention relates to two dimensional assemblies of block co-polymer films comprising nano-rods (NRs) having an ordered orientation at their surface.

BACKGROUND OF THE INVENTION

The tailored integration of nanoparticles as functional building blocks in photovoltaic, optical, electronic, and sensing devices requires macroscopically controlling the morphology of the nanoparticle ensemble. This is of particular interest in the case of anisotropically shaped nanorods, where the collective properties of the plurality of nano-rods strongly depend on rod alignment and internal organization.

A variety of methods to achieve macro-control over spherical nanoparticles have been reported, including close-packed superlattices (Murray et. al. *Annu. Rev. Mater. Sci.* 2000, 30, 545-610), lithographic methods (Cui et al. *Nano Lett.* 2004, 4, 1093-1098), and self-assembly techniques (Bockstaller et. al. *J. Am. Chem. Soc.* 2003, 125, 5276-5277; Chiu et. al. *J. Am. Chem. Soc.* 2005, 127, 5036-5037; Zhang et. al. *Nano Lett.* 2005, 5, 357-361).

The self-organization property of block copolymers (BCPs) has been successfully harnessed to direct spherical nanoparticles to specific copolymer domains (Matsen et al., *Science* 2001, 292, 2469).

Outside the scope of liquid crystalline ordering (Kim et al. *J. Am. Chem. Soc.* 2001, 123, 4360-4361; Li et al. *Adv. Mater.* 2003, 15, 408-411; *Nano Lett* 2002, 2, 557-560. *Adv. Mater.* 2007, 19, 2073-2078; *J. Mater. Chem.* 2008, 18, 3050) comparatively little control has been achieved in macroscopic ordering of anisotropic rod and rod-like nano-particles, especially into hierarchical structures, probably due to the complexity of these self-assembly hybrid systems. Factors, such as strong and directional van der Waals attraction between the nano-rods (resulting in the formation of NR aggregates), the tendency to form liquid crystalline phases, and additional orientational entropy of the anisotropic nanoparticles, introduce complexity and challenges to the controls of these systems.

However, current knowledge of the phase behavior of rod-shaped nanoparticles/BCP assemblies is limited mostly to bulk composites and there is little understanding on the behavior of such systems in thin films (Zhang et al. *J. Am. Chem. Soc.* 2006, 128, 3898; Gon Son et al. *ACS Nano* 2009 3, 3927).

Deshmukh et al. (*Nano Lett.* 2007, 7, 3662) assembled gold NRs inside thick films consisting of lamellae of polystyrene-block-poly(methyl methacrylate) (PS-b-PMMA) and found that the nanorods orient parallel to the lamellae direction with limited deviation from the parallel orientation, dictated by the NR length relative to the BCP domain size. Theoretical studies by Balazs et al. (*Compos. Interfaces* 2003, 10, 343) and Ma et al. (*J. Phys. Chem. B* 2009, 113, 10117) also concluded that NR orient parallel to the BCP domain axes.

Other methods known in the art for controlling NR orientation, alignment and closed-packed form include: applying an electric field during solvent evaporation (Ryan et al. *Nano Lett.* 2006, 6, 1479; Gupta et al. *Nano Lett.* 2006, 6, 2066), stretching polymer films containing NRs (van der Zande et al. *J. Phys. Chem. B* 1999, 103, 5761) electron beam lithography with a lift-off technique (Ueno et al. *Opt. Lett.* 2005, 30, 2158), deposition on chemically patterned substrates (Liu et al. *Small* 2006, 2, 1448) and optical trapping via laser radiation (Pelton et al. *Opt. Lett.* 2006, 31, 2075). Alignment of a monolayer of silver nanowires on silicon was also achieved using the Langmuir-Blodgett technique (Tao et al. *Nano Lett.* 2003, 3, 1229).

There is thus a need to provide BCP films comprising organized nano-rods in order to enable the creation of arrays of individually addressable nano-components that make up devices.

SUMMARY OF THE INVENTION

The present invention provides an assembly comprising a block co-polymer film having at least two domains; and a plurality of nano-rods; wherein said plurality of nano-rods are oriented at the surface of said block co-polymer film, substantially perpendicular to at least one interface between block co-polymer domains. It is noted that said nano-rods are located substantially at the surface of said block co-polymer film.

The term "block co-polymer having at least two domains" as used herein is meant to encompass a polymer formed from two or more homo-polymer subunits (blocks) linked by covalent bonds. The union of the homo-polymer subunits may require an intermediate non-repeating subunit, known as a "junction block". Block copolymers with two, three, four and multiple homo-polymer units are referred to as diblock, tri-block, tetra-blocks and multi-blocks respectively.

The connection of each homo-polymer unit (block) to another homo-polymer unit (another block) in a block copolymer may be a linear (i.e. the blocks are connected end-to-end), star shaped (i.e. all of the blocks are connected via one of their ends at a single junction), grafted (one block makes the backbone and another type of block is grafted said backbone) and so forth. The number of monomer types in a block co-polymer may be less than or equal to the number of blocks. Thus, an ABC linear tri-block consists of three monomer types, whereas an ABA linear tri-block consists of two monomer types.

Non limiting examples for controlled polymerization techniques of block copolymers include: atom transfer free radical polymerization (ATRP), reversible addition fragmentation chain transfer (RAFT), ring-opening metathesis polymerization (ROMP), living cationic or living anionic polymerizations and the dual catalyzed chain shuttling polymerization.

At sufficiently high temperatures or in dilute solutions, block copolymers intermix freely, generating a "disordered" structure. However, block copolymers spontaneously self-assemble ("order"), upon lowering of temperature or increasing the concentration of their solution, into a diversity of meso-phases, with the size scale governed by the chain dimensions. In the meso-phases, dissimilar blocks exist in distinct "domains" which are highly enriched in blocks of the same type. Each domain containing essentially of one single block is margined or interfaced by a dissimilar domain, on at least one, two, three, four, etc of its faces (depending also on the morphology of the domain). The covalent bonds linking the dissimilar blocks are thus localized to the vicinity of the domain interfaces.

Self-assembly of block copolymers into ordered domains is due to incompatibility between each pair of blocks in the block copolymer. Thus, block copolymers undergo a process of "micro phase separation". Depending on the relative lengths of each block, several morphologies can be obtained, such as for example: lamellar, cubically packed spheres, hexagonally packed cylinders, bicontinous gyroid.

The Flory-Huggins interaction parameter, $\chi$, quantifies the incompatibility between the two blocks and is related to whether or not they will microphase separate. For example, a diblock copolymer of symmetric composition will microphase separate if the product $\chi N$ is greater than 10.5. If $\chi N$ is less than 10.5, the blocks will mix and microphase separation will not be observed.

When referring to nano-rods of an assembly of the invention being substantially "perpendicular to at least one interface between block co-polymer domains" it should be understood to refer to the direction of said plurality of nano-rods on the surface of said block co-polymer film, being perpendicular to at least one interface formed by at least two adjacent domains of said block co-polymer. It should be understood that plurality of nano-rods of an assembly of the invention interact (by any type of attractive or repulsive interaction, such as for example electrostatic, chemical or interactions, non-limitingly including Van-der-Waals interactions, hydrogen bond interactions, metal-metal interactions, $\sigma$-interactions, $\pi$-interactions, complex interactions etc.) with at least one domain of a block co-polymer of the invention, in a way that locates said nano-rods on the surface of said at least one domain of said block co-polymer (i.e. hosting domain). The orientation of nano-rods of an assembly of the invention is such that positions them substantially perpendicular to at least one contiguous domain of a dissimilar polymer at the interface of said hosting domain, which may be located at least one face of said hosting domain.

In some embodiments said nano-rods at the surface of said block co-polymer film are oriented substantially perpendicular to a domain axis (on the relative transverse axis, at the surface of block co-polymer film) formed by at least one contiguous domain of a dissimilar polymer block (domain at the interface of hosting domain).

When relating to substantial perpendicular orientation of said plurality of nano-rods, it should be understood to relate to a film wherein at least 80% of plurality of nano-rods in said film, are oriented perpendicular to at least one interface between block co-polymer domains. In other embodiments at least 90% of nano-rods in said film are oriented perpendicular are oriented perpendicular to at least one interface between block co-polymer domains. In further embodiments at least 95% of nano-rods in said film are oriented perpendicular to at least one interface between block co-polymer domains. In further embodiments at least 98% of nano-rods in said film are oriented perpendicular to at least one interface between block co-polymer domains. In further embodiments at least 99% of nano-rods in said film are oriented perpendicular to at least one interface between block co-polymer domains.

It should be understood that the perpendicular orientation of nano-rods is meant to encompass a degree of between about 70° to about 90° between the nano-rod long axis and at least one interface between block co-polymer domains.

In some embodiments, said block co-polymer comprises at least two polymer units.

In other embodiments each polymer unit (block) of said block co-polymer is independently selected from polystyrene (PS), poly(methyl methacrylate) (PMMA), poly(2-vinyl pyridine), poly(4-vinyl pyridine), poly(ethylene oxide), poly (n-butyl acrylate), acrylates, methacrylates, polyisoprene, poly(butadiene) (both 1,2 and 1,4 additions), poly(lactic acid), poly(epsilon-caprolactone) and any derivatives thereof.

Other possible polymer units in block co-polymer of the invention may include polymers provided by ring opening metathesis polymerization (ROMP), such as for example derivatives of polynorbornenes and poly(cyclo-octadiene), above noted polymer derivatives (such as for example poly (4-methoxystyrene)), polymers that have been further modified after the assembly (e.g., hydrolysis of poly(tert-butyl acrylate), which affords poly(acrylic acid)).

In one embodiment, said block co-polymer comprises polystyrene (PS) as one polymer unit of said block co-polymer, thereby forming one domain of said block co-polymer. In another embodiment, said block co-polymer comprises poly(methyl methacrylate) (PMMA) as one polymer unit of said block co-polymer, thereby forming one domain of said block co-polymer. In some other embodiment, said at least two polymer units of said block co-polymer comprise PS and PMMA, thereby forming two separate domains of said block co-polymer.

In other embodiments, an assembly of the invention further comprising nano-particles selected from nano-spheres, nano-dots, nano-wires and nano-tubes.

The term "nano-rod" as used herein is meant to encompass any particle having at least one dimension in the nano scale, having an aspect ratio (ratio between the length and the diameter of the nanorod) of more than about 1. In some embodiments the aspect ration of a nanorod utilized by the invention is between about 3 to about 10. In other embodiments said nano-rod aspect ratio is between about 3 to about 6.

In further embodiments an assembly of the invention, plurality of nano-rods in an assembly of the invention comprises at least two types of nano-rods. When referring to at least two types of nano-rods it should be understood to include nano-rods which differ in at least one of their physical properties (density, melting point, electrical conductivity, coefficient of thermal expansion, magnetic permeability, lattice parameters etc.), structural properties (any geometrical properties of nano-rods such as for example length, width, aspect ratio etc.) and chemical properties (such as for example the material nano-rod is made of and proportions thereof, modification of nano-rod surfaces such as homogenous and non-homogenous coatings, brushes, protecting monolayers, ligands, etc.).

In certain embodiments of the invention, said plurality of nano-rods are formed of a material selected from inorganic material, metal, a transition metal, a semiconductor, an insulator, an alloy and an intermetallic material.

In some embodiments, the inorganic material is or composes an element of Groups IIIB, IVB, VB, VIB, VIIB, VIIIB, IB, IIB, IIIA, IVA and VA of block d of the Periodic Table of the Elements.

In some embodiments, a transition metal is selected from Groups IIIB, IVB, VB, VIB, VIIB, VIIIB, IB and JIB of block d the Periodic Table.

In some embodiments, the transition metal is a metal selected from Sc, Ti, V, Cr, Mn, Fe, Ni, Cu, Zn, Y, Zr, Nb, Tc, Ru, Mo, Rh, W, Au, Pt, Pd, Ag, Mn, Co, Cd, Hf, Ta, Re, Os, Ir, Hg, Rf, Db, Sg, Bh, Hs, and Mt.

In some embodiments, the semiconductor material is selected from elements of Group II-VI, Group III-V, Group IV-VI, Group III-VI, Group IV semiconductors and combinations thereof.

In other embodiments, the semiconductor material is a Group II-VI material being selected from CdSe, CdS, CdTe, ZnSe, ZnS, ZnTe, HgS, HgSe, HgTe, CdZnSe and any combination thereof.

In further embodiments, Group III-V material are selected from InAs, InP, InN, GaN, InSb, InAsP, InGaAs, GaAs, GaP, GaSb, AlP, AlN, AlAs, AlSb, CdSeTe, ZnCdSe and any combination thereof.

In additional embodiments, the semiconductor material is selected from Group IV-VI, the material being selected from PbSe, PbTe, PbS, PbSnTe, $Tl_2SnTe_5$ and any combination thereof.

In other embodiments, a metal alloy is selected from WMo, MoRh, $MoRh_3$, $Rh_{0.34}Ru_{0.66}$, $Rh_{0.4}Ru_{0.6}$, PdRh, PdRu, $MoPd_2$, $Pd_{0.3}Mo_{0.8}$, MoPt, $Mo_2Pt$, PtPd, $Pt_{0.4}Ru_{0.6}$, $Pt_{0.2}Ru_{0.8}$, PtRh, WPt, AuPd, AuPt, AuRh, AuRu, AuMo, and AuW.

When referring to intermetallic materials it should be understood to encompass materials having characteristics of both metals and ceramics that possess long-range-ordered crystal structures. Intermetallics contain both metallic and covalent bonds, depending on the constituent metals. Such intermetallic material is selected from $Ni_3Al$, FeAl etc.

In some embodiments, said plurality of nano-rods are formed from semiconductor material. In yet further embodiments, said semiconductor material is selected from CdSe, CdS, CdTe, ZnSe, ZnS, ZnTe, HgS, HgSe, HgTe, CdZnSe, InAs, InP, InN, GaN, InSb, InAsP, InGaAs, GaAs, GaP, GaSb, AlP, AlN, AlAs, AlSb, CdSeTe, ZnCdSe, PbSe, PbTe, PbS, PbSnTe, $Tl_2SnTe_5$, $RuS_2$, $RuO_2$, $MoS_2$, $MoO_3$, $RhS_2$, $RuO_4$, $WS_2$ and $WO_2$.

In some embodiments of the invention, said block co-polymer film has a thickness of between about 5 nm to about 500 nm.

In further embodiments, block co-polymer has a wt % (concentration) of between about 0.01 to about 5% wt.

It is noted that certain conditions (such as for example the concentration of. BCP, the temperature of the mixture of BCP and NR, the solvent composition used etc.) of mixtures of BCP and NR should selected in a manner that does not allows the formation of three-dimensional nano-rod aggregates on said film surface. It is further noted that such conditions will allow the formation of a monolayer of NR on the surface a film.

In certain embodiments, the ratio between the width of said at least one domain of said block-copolymer and nano-rod effective length is between about 1 to about 5. Thus said domain (host domain) may contain 1, 2, 3, 4, 5, . . . nano-rods oriented at the width of said domain perpendicular to at least one interface between block co-polymer domains.

In further embodiments of the invention, said at least one domain of said block co-polymer is formed from a polymer unit having a molecular weight of at least about 10 kDa to about 1000 kDa.

In further embodiments, said plurality of nano-rods forms a monolayer at the surface of said at least one domain of said block co-polymer film. Thus, in such embodiments said plurality of nano-rods are oriented perpendicular to at least one interface between block co-polymer domains, thereby forming a mono-layer of perpendicularly oriented nano-rods.

In yet further embodiments, an assembly of the invention has a nano-rod filling fraction is between about 0.01 to about 0.70.

When referring to "nano-rod filling fraction" it should be understood to relate to the volume fraction of the nano-rods from the total volume of the film: $\phi$ (or f)=$V_{NR}/[V_{NR}+V_{BCP}]$.

The surface coverage of plurality of nano-rods in an assembly of the invention is calculated as the ratio between an area covered by nano-rods in a predetermined film area and the complete predetermined film area: $\sigma$ (or s)=$A_{NR}/A_{total-film}$. In some embodiments, the surface coverage of an assembly of the invention is between about 0.05 to about 0.8. In other embodiments the surface coverage of an assembly of the invention is between about 0.3 to about 0.6.

In another one of its aspects the invention provides a device comprising at least one assembly according to the invention. In some embodiments, said device is selected from an opto-electric device, magnetic storage device, a biomedical device, a diode, a light emitting device, a sensor, a diagnostic device.

In a further aspect the invention provides a method of forming an assembly comprising a block co-polymer film having at least two domains; and a plurality of nano-rods; wherein said plurality of nano-rods are oriented substantially perpendicular to at least one interface between block co-polymer domains, said method comprising the steps of:
  Providing a solution of block co-polymer;
  Providing a plurality of nano-rods having an aspect ratio of more than about 1;
  Mixing said plurality of nano-rods and block co-polymer in solution;
  Casting a film of said mixture of plurality of nano-rods and block-copolymer from said solution;
  Subjecting said film to conditions allowing phase separation of block co-polymer;
  thereby forming an assembly comprising a block co-polymer film and a plurality of nano-rods.

In some embodiments of a method of the invention the concentration of said block co-polymer is between about 0.01 to about 5% wt.

It is noted that the concentration of block co-polymer is selected such that does not allow the formation of three-dimensional nano-rod aggregates on said film surface.

As used herein the term "conditions that allow phase separation" is meant to encompass any condition leading to the micro-phase separation of the different blocks of said block co-polymer. Non limiting conditions include: thermal treatment, solvent annealing in a variety of possible solvents.

It is noted that further conditions (such as for example the concentration of BCP, the temperature of the mixture of BCP and NR, the solvent composition used etc.) of mixtures of block co-polymer and plurality of nano-rods may also be selected so as to allow the formation of a monolayer of nano-rods on the surface of said film (and thus three dimensional aggregates of NR are not formed).

Casting a film of said mixture of plurality of nano-rods and block-copolymer from said solution may be performed by any casting mode know to a person skilled in the art such as for example: spin coating, drop-casting, spraying, roll-casting.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 2B shows the blue cross-section, where arrowheads mark crossed nanorod-filled PS domains in FIG. 2A.

FIGS. 4A-4F show a 205 kDa PS-PMMA BCP with 33 nm nanorods (FIG. 4A and FIG. 4B; f (filling fraction)=0.31; s (surface coverage)=0.59±0.06); 21 nm nano-rods (FIG. 4C and FIG. 4D; f (filling fraction)=0.11; s (surface coverage)=0.46±0.04) and 11 nm nanorods (FIG. 4E and FIG. 4F; f (filling fraction)=0.10; s (surface coverage)=0.40±0.09) after 15 minutes of annealing in chloroform vapor with high surface coverage of the nanorods.

FIGS. 6A-6F show 205 kDa PS-PMMA BCP with 33 nm nanorods (FIG. 6A and FIG. 6B; f (filling fraction)=0.10; s (surface coverage)=0.12±0.02); 21 nm nano-rods (FIG. 6C and FIG. 6D; f (filling fraction)=0.06; s (surface coverage)=0.22±0.02) and 11 nm (FIG. 6E and FIG. 6F; f (filling fraction)=0.07; s (surface coverage)=0.35±0.05) nano-rods after 15 minutes of annealing in chloroform vapor with low surface coverage of the nanorods.

FIGS. 7A-7I show the kinetics of the self-assembly process, 895 k BCP, with high surface coverage: 33 nm rods (FIG. 7A-7C), 11 nm rods (FIG. 7D-7F). FIGS. 7G-7I show the AFM images of the BCP without nanorods.

FIGS. 8A-8L show the kinetics of the self-assembly process, 205 k BCP, with high surface coverage: 33 nm rods (FIG. 8A-8D), 11 nm rods (FIG. 8E-8H). FIG. 8I-8L show the AFM images of the BCP without nanorods.

FIGS. 9A-9D show films containing the 205 kDa PS-b-PMMA with the 33 and 11 nm rods at high (FIG. 9A f=0.31, FIG. 9C f=0.10) and low (FIG. 9B f=0.10, FIG. 9D f=0.07) filling fractions after 48 hours of annealing in reduced chloroform vapor.

(FIG. 10A, FIG. 10B) Films cast from a dilute (0.25 BCP wt %) solution at nanorod/BCP ratio corresponding to 4)=0.36, before (FIG. 10A) and after 48 hrs annealing in chloroform vapor (FIG. 10B). (FIG. 10C, FIG. 10D) Films cast from a concentrated (0.50 BCP wt %) solution with the same nanorod/BCP ratio ($\phi$=0.36) before (FIG. 10C) and after annealing (FIG. 10D). (FIG. 10E, FIG. 10F) Films cast from a concentrated (0.50 BCP wt %) solution with a lower nanorod filling fraction ($\phi$=0.05) before (FIG. 10E) and after annealing (FIG. 10F).

DETAILED DESCRIPTION OF EXEMPLARY EMBODIMENTS

FIGS. 1A-1F shows high resolution scanning electron microscopy (HR-SEM) images of a self-assembly of asymmetric (PS-b-PMMA) copolymer ($M_n$ 895 kDa, 29.6 wt % PS, 140 nm period, 75 nm PS domain width) and CdSe nanorods of three sizes in ultra-thin films (33 nm, 21 nm, and 11 nm).

The nanorod surfaces were functionalized with the PS chains to enhance their chemical compatibility to the PS domains. The nanorods are located at the film surface, covering 40-60% of the film, and are located exclusively on top of the PS domains. At least theoretically it may be concluded that this situation enables the polymer to maintain its morphology and approximately also its natural periodicity, since the nanorods do not contribute to the effective volume of the PS domains. Additionally, the formation of hierarchical structures is evident, where the nanorods are oriented mostly perpendicular to the PS domain director and the number of nanorods across the domain is determined by the PS domain width and nanorod length (i.e., the 75 nm-wide PS domains accommodate up to 2, 3, and 5 of the 33, 21, and 11 nanorods, respectively).

Figure 1A:
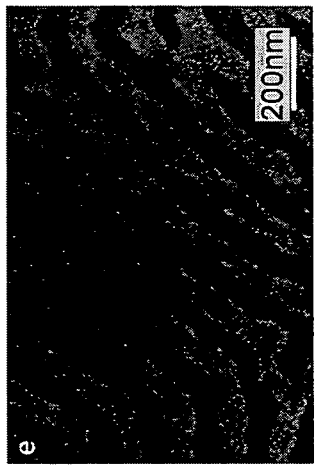
FIGS. 1A-1F show 895 kDa PS-PMMA BCP with 33 nm nanorods (FIG. 1A and FIG. 1B; f (filling fraction)=0.36; s (surface coverage)=0.59±0.02); 21 nm nano-rods (FIG. 1C and FIG. 1D; f (filling fraction)=0.20; s (surface coverage)= 0.51±0.23) and 11 nm nanorods (FIG. 1E and FIG. 1F; f (filling fraction)=0.20; s (surface coverage)=0.41±0.05) after 48 hours of annealing in chloroform vapor, with high surface coverage of the nanorods. Dark areas correspond to the nanorod-free PMMA domains.
Figure 1B:
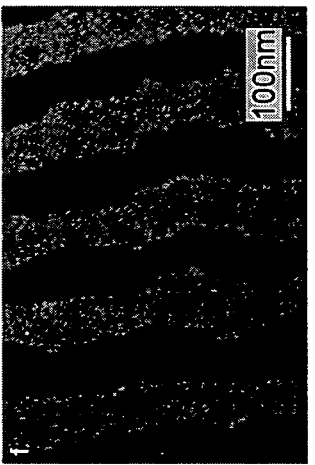
Figure 1C:
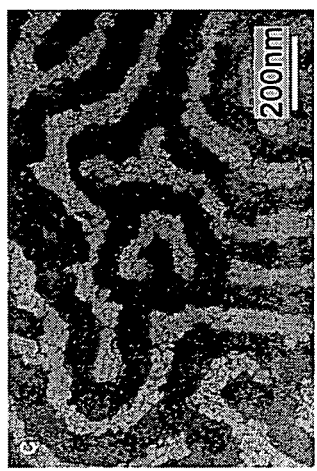
Figure 1D:
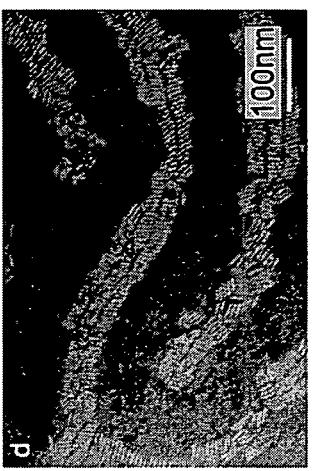
Figure 1E:
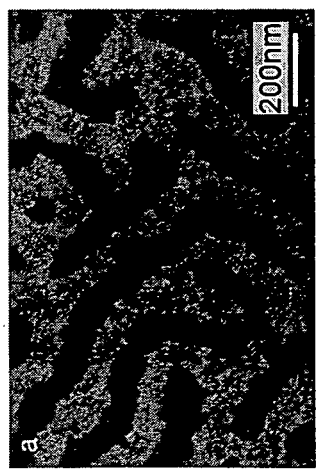
Figure 1F:
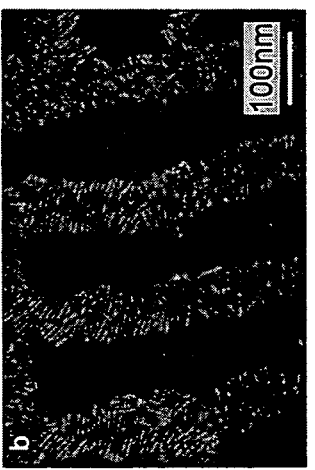
Figures 2A, 2B:
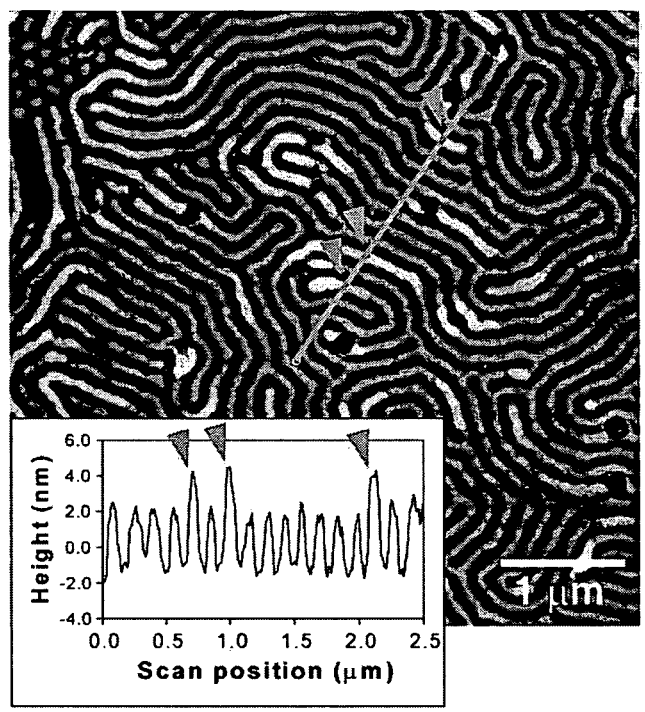
FIGS. 2A-2B shows the AFM height image of an assembly consisting of PS-b-PMMA and 33 nm PS-protected CdSe nano-rods with a small nanorod content ($\phi$=0.05). Height scale: 10 nm.

The morphologies of these assemblies were further investigated by atomic force microscopy (AFM). An image taken from a film featuring a much smaller filling fraction of the 33 nm rods ($\phi$=0.05) indicates that the nanorods were located at the film surface (FIGS. 2A and 2B), protruding by about 2.5 nm from the PS domains (hence, they are more than halfway embedded into the PS domains). The tendency to segregate to the free surface has been observed previously with spherical nanoparticles, and is assigned to surface tension lowering. The nanorods were organized on top of the ridges of the film (i.e., the PS domains); this structure is unique considering that the most prevailing methods for nanoparticle organization employing corrugated BCP films as surface templates for directed nanoparticle deposition provide organized nanoparticles that reside in the film troughs.

Figure 3A:
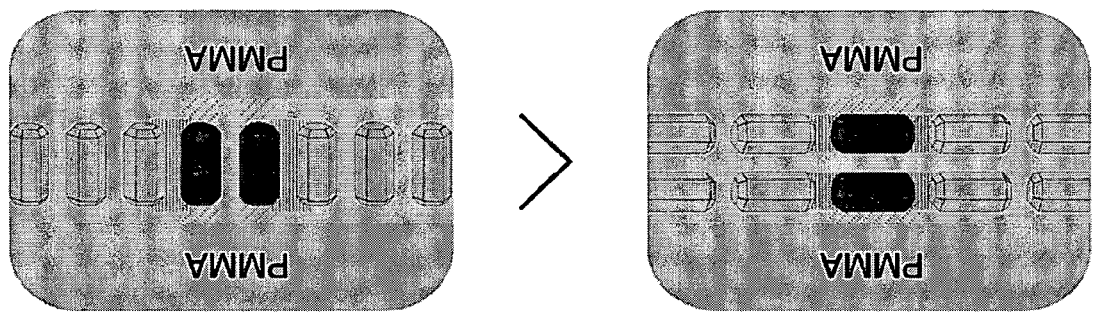
FIGS. 3A-3B show schematic representations of the comparison between the perpendicular (FIG. 3A) and parallel (FIG. 3B) nanorod orientations with respect to their host domain (polymer block upon which nano-rods are oriented). Nano-rods are denoted by rectangular fragments of the assembly used for interaction counting, with peripheral attractive and repulsive interactions depicted as horizontal lines and tilted lines, respectively. PS domains underneath the nanorods are colored in light grey. PMMA domain is colored by a dark grey.
Figure 3B:
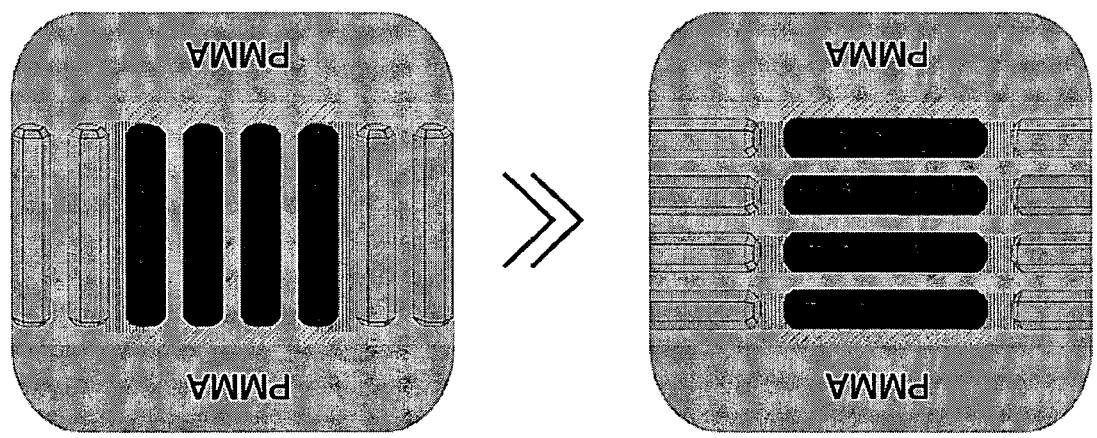
Figure 5A:
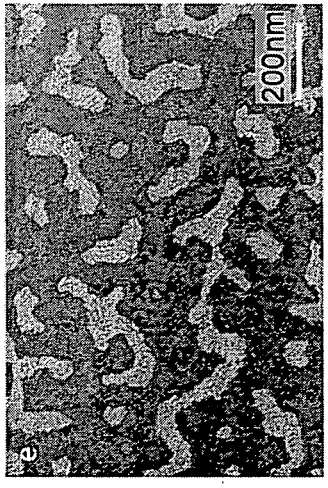
FIGS. 5A-5F show 895 kDa PS-PMMA BCP with 33 nm nanorods (FIG. 5A and FIG. 5B; f (filling fraction)=0.05; s (surface coverage)=0.13±0.06); 21 nm nano-rods (FIG. 5C and FIG. 5D; f (filling fraction)=0.11; s (surface coverage)=0.25±0.05) and 11 nm nanorods (FIG. 5E and FIG. 5F; f (filling fraction)=0.15; s (surface coverage)=0.42±0.05) after 48 hours of annealing in chloroform vapor with low surface coverage of the nanorods.
Figure 5B:
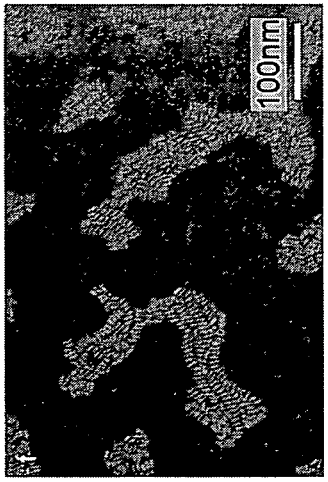
Figure 5C:
Figure 5D:
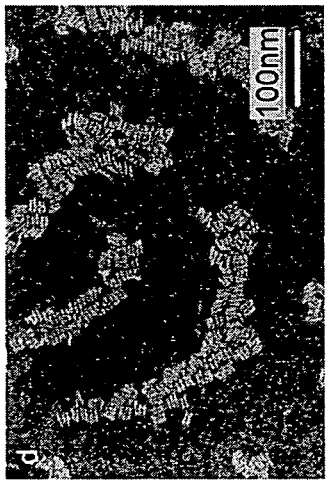
Figure 5E:
Figure 5F:
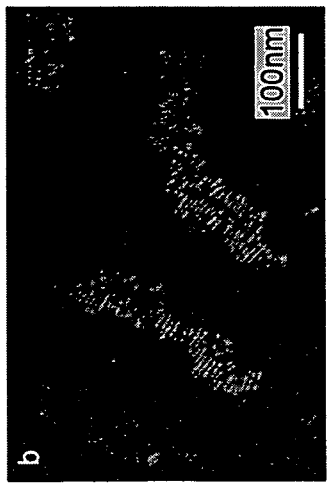
Figures 6B, 6D, 6F:
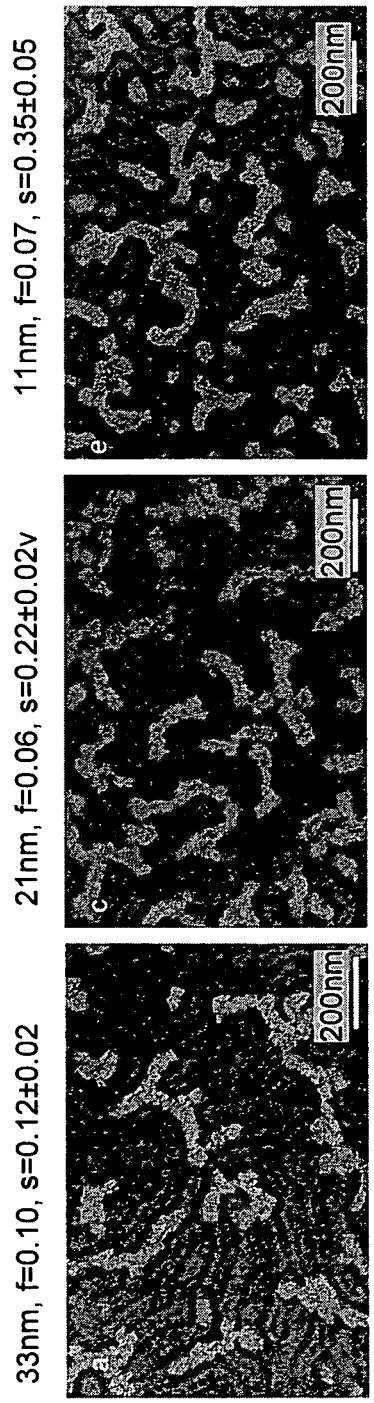

The arrangement of the nanorods perpendicular instead of parallel to the PS domain axis (or interface between block c-polymer domains) give a tool to control the number of rods in the assembly by adjusting the ratio between the PS domain width and the nanorod length. This orientational preference can be explained theoretically by a simplified model, which gives a qualitative description by utilizing geometric considerations and interaction counting and neglecting entropy. The nanorods tend to form smectic-like two-dimensional arrangements maximizing the side-to-side, attractive van der Waals interactions. Additionally, the observed phase separation between the nanorods and the PMMA domains indicates an effective repulsive interaction. To simplify the comparison between the perpendicular and the parallel orientations, it is sufficient to consider a square (or nearly square) single row sub-aggregate of nanorods filling its host domain (FIGS. 3A-3B). Since the attractive interactions between adjacent nanorods within the sub-aggregate are the same in both orientations, one has to count only the interactions at the periphery of the sub-aggregate (i.e., with the neighboring nanorods in the aggregate and with the PMMA interfaces). Thus, in the example depicted in FIG. 3A, the perpendicular orientation features 2 side-to-side attractive interactions with neighboring sub-aggregates and 8 tip-to-edge repulsive interactions with the PMMA interface, while for the parallel orientation one has to count 8 tip-to-tip attractive interactions with neighboring sub-aggregates and 2 side-to-edge repulsive interactions with the PMMA interface. Making the plausible assumption that the contact area of the side of the nanorod is always larger than the sum of contact areas of the tips that span the same length (which are equal in number to the aspect ratio of the nanorod rounded to the closest integer; 4 in this example) leads to the conclusion that the contribution of the nanorod-nanorod interaction to the aggregate energy is larger in the perpendicular orientation than in the parallel orientation. Considering the repulsive nanorod-PMMA interactions this theoretically leads to a similar conclusion. This perpendicular orientation preference would remain unchanged also for multiple row aggregates, since the calculated attractive interaction energy within the nanorod assembly should scale linearly with the number of rows.

Controlling the number of rods across the domains can be achieved not only by altering the length of the nanorods but also, through modifying the size of the BCP. For this purpose, a shorter, 205 kDa PS-b-PMMA (30.7 wt % PS, 70 nm period, 35 nm PS domain width) was employed. The films produced were 20-22 nm thick, which is ca. 30% of the natural BCP period, and featured similar surface coverage values as in the long BCP case (40-60%). It was expected that the difference between the shorter host domain and wider host domain BCPs would be a smaller number of nanorods across the PS domains and a possible strong deviation from 90° orientation for in the case of 21 nm rods due to a larger mismatch between the PS domain width and a complete multiple of the NR length.

FIGS. 4A-4F demonstrates that the nanorod assembly depends on the BCP periodicity in a more intricate fashion than expected. It was shown that the smaller periodicity not only reduces the number of nanorods accommodated across each PS domain, but also gives rise to an apparent decrease in selectivity in the nanorod location, which is manifested in the form of short bridges between the nanorods on adjacent PS domains. The 33 and 21 nm nanorods (FIGS. 4A, 4B, 4C and 4D respectively), form a stripe-like structure that generally follows the PS domain widths and directionality, with the expected number of rods across the PS domain (i.e., a single particle for the 33 nm rods and pairs for the 21 nm rods). The bridges seem to be located on top the PMMA domains, with no specific internal organization between the nanorods. This situation is aggravated in the case of the 11 nm rods (FIGS. 4E and 4F), which form more extended, round aggregates with reduced correlation to the expected phase-separated structure of the underlying BCP film. At this point it is difficult to determine that the bridges of extended aggregates indeed cover PMMA domains. Nonetheless, it is important to notice that the aggregates of the 11 nm rods are surrounded by PMMA domains at their circumference, which indicates that the BCP accommodates itself to the existence of the NR assembly. Thus, instead of paying a thermodynamic penalty of accommodating PS-covered NRs on top of PMMA domains, another plausible option is that the BCP may have reorganized underneath these extended aggregate, forming a compatible PS layers that is parallel to the substrate.

To lower the amount of NR aggregates and thus avoid the formation of bridges, lower fractions of NRs were introduced. The surface coverage magnitudes (a) were changed to 12-13%, 22-25%, and 35-42% for 33, 21, and 11 nm rods, respectively, for both narrow (205 kDa) and wide (895 kDa) host domain BCPs. Comparison of the long range order of the 895 kDa BCP in high (FIGS. 1A-1F) and low (FIGS. 5A-5F) surface coverage samples, shows that the long range order of the BCP has decreased at low surface coverages for all nanorod lengths, where the PS domains appear discontinuous. It is important to note, that while there is enough space on top of the PS domains to accommodate the NRs in a sparse arrangement at the low surface coverage probed, the NRs still assembled into compact two-dimensional arrangements, leaving behind large spaces completely clear of NRs. This observation further supports the theoretically energetic preference of NRs for side-by-side aggregation, which dominates over the entropic tendency for a more uniform distribution of the NRs in their hosting domains.

Nonetheless, it is noted that the assemblies of all nanorod types include less than the maximum number of NRs than can be accommodated within the PS domains. These assemblies are located at the center of the PS domains, with the NRs still oriented preferentially perpendicular to the domain type. Taking the theoretical interaction counting considerations into account, these observations are in accord with the tendency of the system to maximize the number of side-to-side over tip-to-tip interactions while at the same time lowering the unfavorable contact of the PS-covered NRs with the PMMA matrix. We conclude from the above mentioned phenomena that high nanorod filling fractions, which lead to crowding and stronger BCP confinement, gives rise to extended NR assemblies featuring the maximum number of NRs that can be accommodated across the PS domain, which in turn induce longer range ordering of the BCP matrix, and is thus an essential condition for production of highly ordered nanorods arrays shown in FIGS. 1A-1F.

In comparison to the 895 kDa polymer, the long range ordering of the 205 kDa BCP was not affected by the extent of nanorod surface coverage by moving to low surface coverage values (FIGS. 6A-6F). Notably, however, the selectivity of the nanorod location was higher for all nanorod lengths, the number of bridges has decreases, and the 33 and 21 nm rods adopted the perpendicular orientation. The last observation is explained mainly by a decrease in number of pre-existing aggregates, which allow their extension inside the narrow 35 nm PS domains. The short 11 nm rods also exhibit enhanced selectivity, but there seems to be no apparent preference for the perpendicular orientation. Additionally, there are considerably more two-dimensionally extended aggregates in the 11 nm rods compared to the longer rods, which force the PS domains to become substantially wider at bifurcation points or domain caps (dislocations and disclinations). This is attributed to the high tendency of short NRs to pack into extended two-dimensional structures already upon casting, in an analogy to spreading rice grains compared to jackstraws in a confined two-dimensional space.

Figures 7G, 7H, 7I:
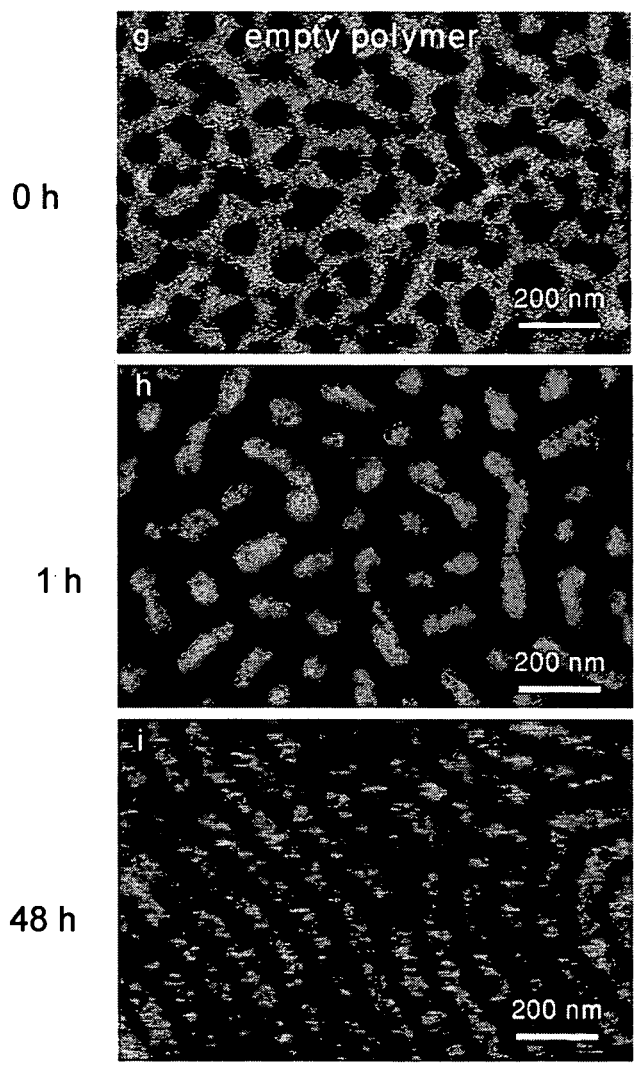

The evolution of structure through the co-assembly process, was studied by taking SEM images after exposing films consisting of the 11 and 33 nm rods to different time intervals, and compared them to AFM images of the neat BCP films in the 895 and 205 kDa polymers (FIGS. 7A-7I and FIGS. 8A-8L, respectively). Both polymers feature a certain degree of phase separation already as cast (FIG. 7G and FIG. 8I). The length of time required for the evolution of order was different for each polymer (15 minutes for the 205 kDa BCP compared to 48 hr for the 895 kDa polymer; see FIGS. 8I-8L and FIGS. 7G-7I, respectively) due to the substantially slower diffusion kinetics of the long copolymer.

The initial structures of as-cast composite films feature disordered monolayers of NRs that roughly correlate to the respective phase separated structures of the neat BCP films (FIGS. 7A, 7D, 7G and FIGS. 8A, 8E and 8I). During annealing, the surface coverage (s) in all films remains rather constant (within less than 8% standard deviation), which indicates that most NRs were present at the film surface already upon casting. As the BCP organizes, its domains are elongated and their ordering is improved, the NR clusters organize concomitantly. In the 895 kDa BCP/33 nm rods system, initially there is no preferred local orientation of the NRs with respect to their hosting domains, and the perpendicular orientation starts to prevail only after extended exposure to the solvent vapor. In the shorter NR case with the 895 kDa BCP no substantial preference to the perpendicular orientation is observed at the high surface coverage used as explained by the energy considerations mentioned above, but the initial assemblies formed become more extended and their perimeter become smoother as the annealing proceeds. These phenomena evidence the effect of the BCP on the formation and ordering of the NR assemblies.

Similar observations were made in the 205 kDa films. The main distinction between the two BCP systems is the much smaller size of the initial PS domains in the 205 kDa polymer compared to the size of the initial NR aggregates, especially in the films containing the 11 nm rods. Upon prolonged annealing, the ordering BCP can hardly break these aggregates, and rather organizes around them.

In both BCP systems the large scale ordering of the composite film is considerably lower than that of the neat BCP film (see FIGS. 7D, 7F and 7I and FIGS. 8D, 8H and 8L). This behavior suggests that defects formed in the BCP films, which otherwise would have been transient, become fixated when the organizing PS domains carry NR assemblies at their surface due to the irreversible nature of the NR aggregation. Additionally, it could be argued that the lower level of ordering observed in the 205 kDa BCP films is a result of the relatively fast diffusion rate of the polymer chains under saturated chloroform vapor, which drives the assembly to kinetically controlled structures consisting of a large number of defects such as bridges and extended assemblies. Nonetheless, it was found that conducting the solvent annealing under reduced chloroform vapor pressure, which slows down the ordering kinetics of the 205 kDa polymer, results in essentially the same structures after 48 hrs of annealing (instead of 15 minutes; see FIGS. 9A-9D). The above observations thus indicate that self-assembly of block copolymers and nanorods is a cooperative process, which is nonetheless dominated by the strong aggregation tendency of the nanorods.

Figure 10A:
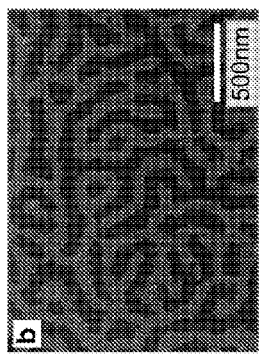
FIGS. 10A-10F show the effects of casting solution concentration on the ability to obtain hierarchical structures with the 33 nm rods.
Figure 10B:
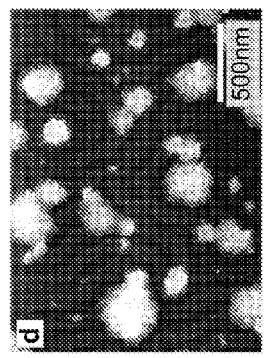
Figure 10C:
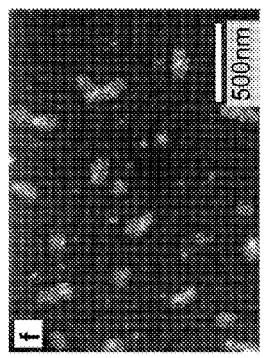
Figure 10D:
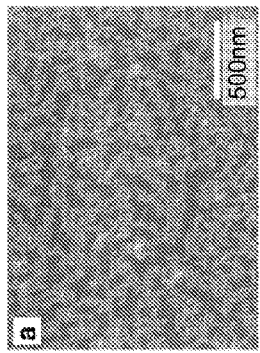
Figure 10E:
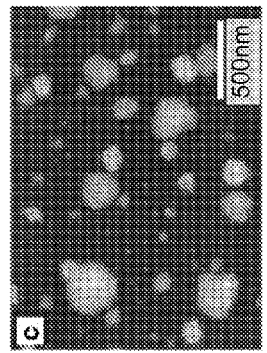
Figure 10F:
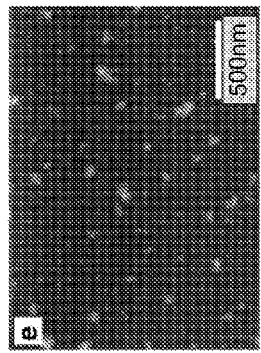

The formation of hierarchical structures indicates that the process is a cooperative assembly of the BCP and the nanorods, attained through interplay between phase separation and nanorod aggregation. To further investigate the intricate balance leading to such co-assembly we compared films made from two solutions, featuring the same nanorod/BCP ratio ($\phi$=0.36) but differing in the solution concentration (0.25 vs. 0.50 BCP wt %) (FIGS. 10A-D). Notably, while the ultrathin film (17 nm) cast from the more dilute solution gave rise to the hierarchical monolayer structures discussed above (FIGS. 1A-1F and FIG. 10B), the thicker film (30 nm) cast from the more concentrated solution featured non-uniform three-dimensional (3D) clusters of nanorods that do not correlate with the phase-separated structure of the polymer (FIG. 10D). An inspection of the films prior to annealing revealed that these clusters exist already upon casting (FIG. 10C). Films cast from the more dilute solution feature a monolayer structure of nanorods, which lacks internal organization but is still related to the partially phase separated structure of the BCP (FIG. 10A). Without wishing to be bound by theory, it is noted that these differences probably do not arise from surface crowding (following the mere fact that thicker films contain a larger number of nanorods in total), since a film cast from a concentrated solution (0.50 BCP wt %) but with a much lower filling fraction ($\phi$=0.05) still featured 3D aggregates upon casting (FIG. 10E). These clusters were smaller due to the lower filling fraction, which led to their localization into defect points (i.e., dislocations, disclinations, and bends) in the resulting phase separated structures (FIG. 10F), where the local density of the polymer is lower.

Thus, the phase separation process induced by the BCP through the annealing process is not strong enough to fragment nanorod clusters to create a monolayer assembly. Thus, hierarchical structures form only in cases where films manifest a monolayer structure of the nanorods already upon casting, which can be further co-organized with the relaxing polymer. Under such conditions, not only selective segregation of the nanorods to the preferred domains is achieved, but also the unique smectic arrangements can be attained. Mesoscopic ordering with this co-assembly scheme can be further improved by employing mechanisms that align the BCP domains such as substrate patterning.

The selective location of the nanorods demonstrated, essential in applications of organized BCP/NRs composites, strongly depends on the BCP period, and has a key role in inducing spatially confined organization of the initial random monolayer aggregates that form in the as-cast films. High filling fractions of the NRs were found to be necessary for achieving strong confinement by the BCP domains and leads to high level of interparticle organization, where the ratio between the domain width and nanorod length dictates the number of nanorods accommodated across the domain.

Experimental

Sample Preparation

Synthesis of PS-Covered CdSe Nanorods:

Tri-n-octylphosphine (TOPO)-covered CdSe nanorods were synthesized according to the synthesis depicted in Mokari et al. (*Chem. Mater.* 2003, 15, 3955). Thiolated polystyrene (PS-SH) ligands were synthesized by atom transfer radical polymerization of styrene, yielding bromide end-functionalized polystyrene (PS-Br) (Mn=3.5 kg mol-1, polydispersity 1.20; or Mn=2.6 kg mol-1, polydispersity 1.27), followed by modification with thiourea and NaOH to obtain the thiol endgroup (see Garamszegi et al. *React. Func. Polym,* 2003, 55, 179).

The TOPO-stabilized nanorods were first precipitated in methanol, separated from the excess TOPO by centrifugation, and redispersed in toluene. Then a 2-fold excess of PS-SH relative to the number of the surface Cd atoms was added and the solution was stirred at room temperature under inert atmosphere overnight. The modified nanorods were purified from excess PS-SH by precipitation in methanol and centrifugation, redispersed in toluene and their concentration was determined by UV-Vis spectrometry for adjusting the nanorod filling fraction in the composite film.

Sample Preparation:

PS-b-PMMA (Mn 895 kDa, 29.6 wt % PS, polydispersity 1.08; and Mn 205 kDa, 30.7% polystyrene, polydispersity 1.08) were purchased from Polymer Source, Inc., and was used as received. Toluene solutions of the polymer (0.25 or 0.50 wt %) were combined with the PS-SH covered CdSe nanorods (33.0±3.3 nm, 20.6±2.3 nm, and 11.0±1.5, with diameters of 4.6±0.8, 3.8±0.4, and 3.9±0.6 nm, respectively, referred to in the text as the 33, 21, and 11 nm rods, respectively) to result in final nanorod volume fractions in the composite films in the range of 0.05-0.36. The solutions were stirred overnight in closed vials and spin coated on cleaned (using NoChromix acid bath, Godax Laboratories, or piranha etch), hydrophilic silicon wafers at 3000 rpm for 1 minute. Films cast from 0.25 and 0.50 wt % solutions measured 10-17 and 30-32 nm in thickness, respectively (according to AFM scans performed across a scratch). The films were dried in vacuum for 30 minutes before annealing in chloroform vapour for up to 48 hours. (Adding polyethylene glycol at different concentrations to the solvent reservoir allows one to reduce the solvent vapor pressure and thus to control the kinetics of the phase separation process by adding).

Measurements

AFM images were recorded on a Dimension 3100 scanning probe microscope with Nanoscope V controller, Veeco, Santa-Barbara, USA. High resolution SEM images were acquired with a Sirion microscope (FEI Company) at 5 or 10 kV acceleration voltages. The effective total dimensions of the PS-modified nanorods as calculated from centre-to-centre distances measured in the SEM images were 36.0, 23.6 nm, and 14.0 (diameters 6.6, 6.0, and 6.0 nm, respectively) for the 33, 21, and 11 nm rods, respectively. The resulting HR-SEM images were analyzed with Lispix graphical program (National Institute of Standards and Technology) to produce gray scale histograms. The nanorod surface coverage presented relate to the average surface coverage calculated from several images, for each filling fraction of the nanorods.

The invention claimed is:

1. An assembly comprising a block co-polymer film having at least two domains; and a plurality of nano-rods; wherein the plurality of nano-rods are oriented at a surface of the block co-polymer film, substantially perpendicular to at least one interface between block co-polymer domains.

2. The assembly according to claim 1, wherein the block co-polymer film has a thickness of from about 5 nm to about 500 nm.

3. The assembly according to claim 1, wherein the block co-polymer has a concentration of from about 0.01 wt % to about 5 wt %.

4. The assembly according to claim 1, wherein a ratio between a width of at least one domain of the block-copolymer and nano-rod effective length is from about 1 to about 5.

5. The assembly according to claim 1, wherein at least one domain of the block co-polymer has a molecular weight of at least about 10 kDa to about 1000 kDa.

6. The assembly according to claim 1, wherein the plurality of nano-rods forms a monolayer at the surface of at least one domain of the block co-polymer film.

7. The assembly according to claim 1, having a nano-rod filling fraction between about 0.01 to about 0.70.

8. The assembly according to claim 1, wherein an aspect ratio of the plurality of nano-rods is from about 3 to about 6.

9. The assembly according to claim 1, wherein the plurality of nano-rods comprises at least two types of nano-rods.

10. The assembly according to claim 1, wherein the plurality of nano-rods are formed of a material selected from the group consisting of a metal, a transition metal, a semiconductor, an insulator, an alloy, and an intermetallic material.

11. The assembly according to claim 1, wherein the plurality of nano-rods are formed from a semiconductor material.

12. The assembly according to claim 1, wherein the block co-polymer comprises at least two polymer units, wherein each polymer unit is independently selected from the group consisting of polystyrene, poly(methyl methacrylate), poly (2-vinyl pyridine), poly(4-vinyl pyridine), poly(ethylene oxide), poly(n-butyl acrylate), acrylates, methacrylates, polyisoprene, poly(butadiene), poly(lactic acid), poly(epsilon-caprolactone), and any derivatives thereof.

13. The assembly according to claim 1, further comprising nano-particles selected from the group consisting of nano-spheres, nano-dots, nano-wires, and nano-tubes.

14. A device comprising at least one assembly according to claim 1.

15. A device according to claim 14, selected from the group consisting of an optoelectric device, magnetic storage device, a biomedical device, a diode, a light emitting device, a sensor, and a diagnostic device.

16. A method of forming an assembly comprising a block co-polymer film having at least two domains; and a plurality of nano-rods; wherein the plurality of nano-rods are oriented substantially perpendicular to at least one interface between block co-polymer domains, the method comprising the steps of:
   providing a solution of block co-polymer;
   providing a plurality of nano-rods having an aspect ratio of more than about 1;
   mixing the plurality of nano-rods and block co-polymer in solution;
   casting a film of the mixture of the plurality of nano-rods and block-copolymer from the solution; and
   subjecting the film to conditions allowing phase separation of the block co-polymer;
   thereby forming an assembly comprising a block co-polymer film and a plurality of nano-rods.

* * * * *